Figure 1:
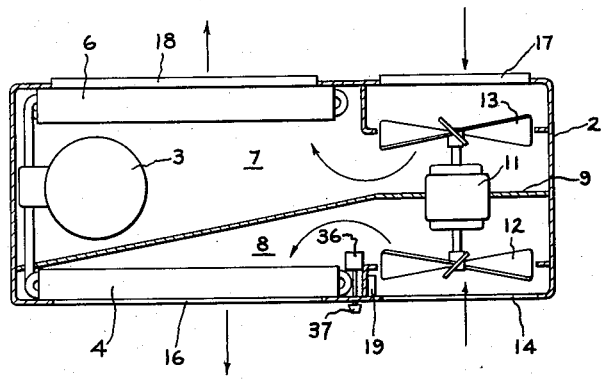

Feb. 7, 1961 J. P. SLATTERY 2,970,455
AIR CONDITIONING APPARATUS
Filed Dec. 21, 1959

INVENTOR.
JOHN P. SLATTERY
BY 
HIS ATTORNEY

United States Patent Office 2,970,455
Patented Feb. 7, 1961

2,970,455

AIR CONDITIONING APPARATUS

John P. Slattery, Louisville, Ky., assignor to General Electric Company, a corporation of New York Filed Dec. 21, 1959, Ser. No. 861,023

3 Claims. (Cl. 62—180)

The present invention relates to air conditioning apparatus and more particularly to an improved electrical circuit arrangement for energizing the fan and compressor motors included in such apparatus and embodying an improved means for changing the speed of the fan motor.

It is normal practice in air conditioning units of the self-contained type to provide at least two alternating current motors for operating the components of the air conditioner. One motor is utilized to operate the compressor of the refrigerating system while at least one other motor is used to drive the fans or blowers required to move air over the heat exchanger of the refrigerating system. The motors are usually connected in parallel to permit operation of the motors either together or separately. It is important that the motors be capable of separate operation as it is sometimes desirable to provide circulation of the air from the enclosure by means of their conditioner when temperature conditions within the enclosure are such that no cooling is required and consequently the refrigerating system need not be operated.

To permit operation of these units on the single phase current supplied in the regular household circuits, many known air conditioner arrangements use a compressor motor of the permanent split capacitor type, i.e., of the capacitor start and run type, and a fan motor of the same type or of the shaded pole type. The present invention is particularly concerned with air conditioning units using compressor and fan motors both of which are of the permanent split capacitor type. Each of these motors contains a run winding and an auxiliary winding which are physically displaced from each other on the stator of the motor. It is normal practice to connect a capacitor in parallel with the main winding of each of these motors and in series with the auxiliary winding in order to shift the electrical phase of the current flowing through the auxiliary windings and to simulate two phase operation of the motors. This, of course, makes the motors self starting as well as increasing the torque of the motors. It has beeen discovered that, by properly designing the fan motor windings and by connecting the fan and compressor motors into a proper electrical circuitry, it is possible to utilize a single capacitor to serve as both a start and run capacitor for both motors. However, it is sometimes desirable to vary or change the speed of the fan motor during particular periods of operation of the air conditioner and the electrical arrangement for varying the fan motor speed must not, to any appreciable extent, affect the operation of the compressor.

Accordingly, it is an object of the present invention to provide an air conditioning unit having fan and compressor motors of the permanent split capacitor type which are electrically connected in such a manner as to share a common capacitor that serves as a starting and running capacitor for both of the motors and including means for varying the speed of the fan motor with negligible effect on the electrical characteristics of the compressor motor.

It is a more specific object of the present invention to provide, in an air conditioning unit, an improved compressor motor and fan motor circuitry in which both motors use a common capacitor that serves as a starting and running capacitor for both motors and which includes a variable reactance so connected within the circuit as to permit appreciable changes in the fan speed with negligible effect on the electrical characteristics of the compressor motor.

Further objects and advantages of the present invention will become apparent as the following description proceeds and the features of novelty which characterize the invention are pointed out with particularity in the claims annexed to and forming a part of this specification.

In accordance with the present invention there is provided an air conditioning unit having a fan and a compressor motor, each motor having a main winding and an auxiliary winding interconnected at one end. The fan motor is provided with an auxiliary winding having at least equal ampere turns as the main winding thereof. The main windings of each of the motors are connected in parallel with each other across a power supply and the auxiliary windings are connected in series with each other across the power supply. A capacitor is connected in series with and between the auxiliary windings of each of the motors and serves as the starting and running capacitor for both motors. In order to vary the speed of the fan motor, a variable reactance is provided having a coil that is connected between the capacitor and the auxiliary winding of the fan motor and arranged in parallel with the main winding of the fan motor across the power supply. By varying the inductive reactance of the variable reactor, the speed of the fan motor is varied accordingly with only negligible effect on the electrical characteristics of the compressor motor.

Figure 2:
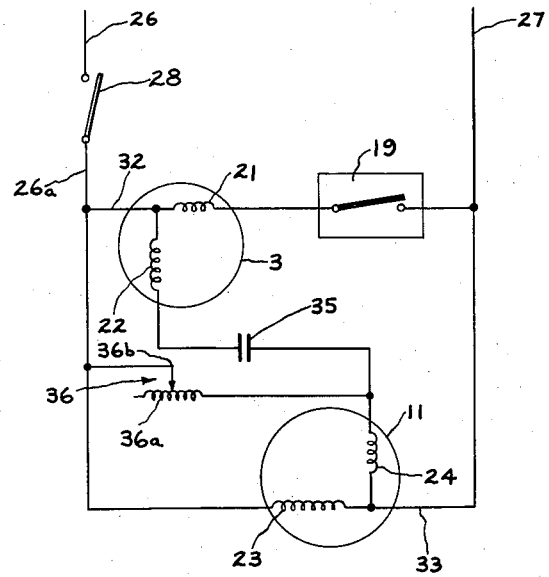
Figure 2:

For a better understanding of the invention, reference may be had to the accompanying drawing in which:

Fig. 1 shows in schematic form an air conditioning unit having a fan motor and a compressor motor; and Fig. 2 is a schematic diagram illustrating the circuit for electrically connecting the fan and compressor motors according to the present invention.

Referring now to Fig. 1, there is shown an air conditioning unit of the self-contained type which is normally positioned within a window or opening in the wall of an enclosure for providing air conditioning within the enclosure. The unit is mounted within a casing 2 adapted for mounting within a window or opening in an outer wall of an enclosure. The air conditioner is provided with a refrigeration system including a compressor 3, an evaporator 4, and a condenser 6 connected in refrigerant flow relationship. These components are arranged within the unit to extract heat from the air circulated from the enclosure through the evaporator 4 of the unit and to discharge this heat into outside air circulated through the condenser 6 of the unit.

The evaporator 4 and condenser 6 are mounted in separate chambers or compartments hereinafter designated the evaporator compartment 8 and the condenser compartment 7. The compartments are separated by an insulated barrier 9 which may, if desired, be provided with apertures permitting air flow between the two compartments. Mounted in the barrier is a fan motor 11 which drives a pair of fans 12 and 13 disposed respectively in the evaporator compartment 8 and in the condenser compartment 7 for circulating air streams through these compartments. Fan 12 circulates a stream of air from the enclosure through the inlet opening 14, through the evaporator compartment 8 and discharges it through the evaporator 4 and outlet opening 16 back into the enclosure. Outdoor air is circulated by the fan 13 to the inlet openings 17 of the condenser compartment 7 and is discharged through the condenser 6 and the outlet opening 18 to the outdoors.

Adjacent the inlet opening 14 there is provided a thermostat 19 which is designed to sense the temperature of the inlet air stream and to cycle the refrigeration system on or off according to the temperature of this air stream. There are times, therefore, when the compressor motor 3 is not operated, while the fan motor 11 is normally continuously operated to circulate air through the condenser and the evaporator compartments. However, there are times when it is desirable to operate the fans at reduced speed while the compressor is operating. For example, during the night, when maximum cooling capacity is not required, it is sometimes desirable to operate the fans at reduced speeds in order to reduce the noise of the unit. As will now be explained, the present invention is concerned with the electrical circuitry designed for economical connection of the fan and compressor motors of the unit and adapted to permit adjustment of the fan speed by the operator over a wide range of different fan speeds without appreciably affecting the operation of the compressor.

Referring now to Fig. 2, the components of the refrigeration apparatus are shown in diagrammatical form in an electrical circuit with the compressor motor indicated at 3, the fan motor indicated at 11 and the thermostat shown at 19. The compressor and fan motors are self starting single-phase inductive motors of the permanent split capacitor type with the compressor motor 3 being the main motor and subject to varying loads and the fan motor being smaller and relatively constantly loaded. The compressor motor 3, which may be of the squirrel-cage induction type, has a main winding 21 and an auxiliary winding 22 and the fan motor 11, which may also be of the squirrel-cage induction type, has a main winding 23 and an auxiliary winding 24. The auxiliary windings 22 and 24 are physically displaced from the main windings 21 and 23 on the stators of the respective motors. Power is supplied to this circuit from a pair of lines 26 and 27 which represents the regular single phase branch circuit found in most of the present day homes. In order to connect the circuit of the air conditioning unit to the branch circuit power lines 26 and 27 there is provided a switch 28 which is shown in the open position in Fig. 2 and which, when closed, supplies current to the operating components of the air conditioner. When the switch is open it breaks the circuit to the power supply line 26 thereby preventing current flow through the air conditioning unit from the one side of the power supply to the other.

The common lead 32, connecting with the main winding 21 and the auxiliary winding 22 of the compressor, which are interconnected at one end, is connected to the power supply line 26a which connects through the switch 28 with the power line 26. The main winding 23 and auxiliary winding 24 of the fan, which are interconnected at one end, are connected to the line 27 through the comomn lead 33. The main winding 21 of the compressor motor 3 and the main winding 23 of the fan motor 11 are connected in parallel with each other across the power supply lines 26a and 27. Also connected in series with the main winding 21 of the compressor motor is the thermostat 19, which cycles the compressor motor on and off according to the temperature of the air stream entering the unit from the enclosure. The auxiliary windings 22 and 24 of the compressor motor 3 and the fan motor 11 respectively are arranged in series across the power supply lines 26a and 27.

A single capacitor 35 is provided for the two motors and this capacitor is included in the series circuit of the auxiliary windings 22 and 24. More specifically, in the preferred embodiment of the invention, the capacitor is interposed between the auxiliary windings 22 and 24 respectively of the compressor and fan motors. It should be observed that the series circuit of the capacitor 30 and the auxiliary windings 22 and 24 of each of the motors is also in parallel with the main windings 21 and 23 of each of the motors. Inasmuch as the auxiliary windings 22 and 24 are arranged in series, the auxiliary winding of the fan motor 11 should be designed to withstand the higher current flow necessary in the compressor auxiliary windings. That is, although the auxiliary winding of the usual type fan motor generally has more turns than the main winding of the conventional type electric motor used to drive a fan, it is preferable, when utilizing the present circuitry, with the auxiliary winding 24 of the fan connected in series with the compressor auxiliary winding 22 and the capacitor 30, that the auxiliary winding 24 of the fan motor have less turns than the main winding 23. More specifically, in the preferred embodiment of the invention, it is contemplated that the auxiliary winding 24 of the fan motor have at least equal number of ampere-turns as the main winding 23 of the fan motor. This is illustrated schematically in Fig. 2 where the auxiliary winding 24 is shown with less turns and much less length than the main winding 23. In this circuit, when the switch 28 is closed and the thermostat 19 is energized to call for cooling of the air flowing through the evaporator compartment, current flows from the line 26a through the main winding 21 of the compressor and the thermostat back to the line 27. Current flows through the auxiliary winding 22 of the compressor and through the auxiliary winding 24 of the fan motor and the common capacitor 30 to the common lead 33 of the fan motor and back to the line 27. Current is also supplied to the main winding 23 of the fan motor through the power supply line 26a and back to the line 27 through the common lead 33. Thus with the thermostat switch calling for energization of the refrigeration system, power is supplied to both the fan motor 11 and the compressor motor 3.

During the starting operation of either of these motors, the capacitor 30 acts as a means for modifying the phase angle of the current in the auxiliary windings of the motor to provide a starting torque for the motor. After the motors are up to speed, the capacitor 30 acts as a run capacitor to improve the power factor of the motors. It should be noted that the current flows through the auxiliary winding 22 of the compressor motor at all times when the fan motor is operated even though the thermostat may be in a position such as to inactivate the compressor motor. Starting of the compressor motor 3 is improved when it is energized while the fan motor 11 is already in operation because the voltage across the capacitor is increased by the operation of the fan motor over what it would be if the compressor were started without the fan motor in the circuit. Thus a greater permissible current flow is supplied to the start winding of the compressor. However, although the use of a single capacitor connection for the two motors causes some minor variation in speed of the fan motor, there is little or no effect on the operation of the compressor motor as long as the capacitance is of a sufficient value to permit proper current flow through the auxiliary winding of the compressor motor during starting.

As was stated previously, it is desirable to permit variation in the speed of the fan motor in order to operate the fans of the unit at different capacities during periods of operation. That is, at night when the heat load of the enclosure is normally lower and when the occupants of the enclosure are generally asleep, it is desirable to operate the unit on a lower fan speed and thus reduce the noise output of the fans at this time. It is necessary, therefore, to be able to vary the speed of the fan motor without appreciably effecting the electrical characteristics of the compressor motor. In order to do this, there is provided a variable reactor generally designated 36 which contains a coil 36a having one end thereof connected at some point between the auxiliary winding 24 of the fan motor and the capacitor 30. The coil 36a of the variable reactor is connected in parallel with the main winding 23 of the fan motor and connects with the power line 26a. The reactor may be provided with a movable switch 36b which may be moved by a control such as the rotatable knob 37 on the front of the unit, to select any number of desirable speed settings. Or the reactor may have a multiple position single pole switch that may be moved into a number of different positions to supply differing amounts of reactance by a movable control means such as the rotatable knob 37 on the front of the unit. Variable reactors of this general type are well known in the art and a detailed description thereof is not believed essential to an understanding of the present invention.

It can be seen that, because winding 24 is at least equal to winding 23, insofar as ampere-turns are concerned, any change in the amount of torque supplied to the rotor by either winding will give a significant change in the speed of the rotor. Changing the setting of the rotatable knob 37 changes the phase angle of circuit comprised of winding 24, capacitor 25, reactor 36, and winding 22 with respect to winding 23. Since the output of this type of motor is a function of the angle between the auxiliary and main windings, then any change in this angle has a noticeable effect on its output and, hence, the speed of fan motor. It will be also noted that this reactance will only have a very slight effect (due primarily to change in capacitor voltage) on the compressor motor, since one end of the reactor is common to the common compressor connection.

In accordance with the present invention there has been provided an air conditioning unit having a compressor and a fan motor arranged in circuitry utilizing a common capacitor which serves as a starting and running capacitor for both of these motors and incorporating a simple arrangement for varying the speed of the fan motor. Moreover, the arrangement for varying the speed of the fan motor has little effect on the electrical characteristics of the compressor motor.

While in accordance with the patent statutes there has been described what at present is considered to be the preferred embodiment of the invention, it will be obvious to those skilled in the art that various changes and modifications may be made therein without departing from the invention, and it is, therefore, the aim of the appended claims to cover all such changes and modifications as fall within the true spirit and scope of the invention.

What I claim as new and desire to secure by Letters Patent of the United States is:

1. In an air conditioning unit having a fan means for moving air through said unit and a refrigeration system including a compressor, the combination comprising a compressor motor, a fan motor, each of said motors having a main winding and an auxiliary winding, said auxiliary winding of said fan motor consisting of at least equal ampere-turns as said main winding thereof, power supply connectors for energizing said motors, said main windings of each of said motors connected in parallel with each other across said power supply connectors, said auxiliary windings of each said motors being connected in series across said power supply connectors, a capacitor connected in series with and between said auxiliary windings of said motors and serving as a starting and running capacitor of both of said motors, an inductive reactor connected in parallel with said main winding of said fan motor and having one end connected between said capacitor and said auxiliary winding of said fan motor, and means for selectively varying said inductive reactor so that the speed of said fan motor is changed with only negligible effect on the electrical characteristics of said compressor motor.

2. In an air conditioning unit having a fan for moving air through said unit and a refrigeration system including a compressor, the combination comprising a compressor motor, a fan motor, a power supply circuit, each of said motors having a main winding and an auxiliary winding, said auxiliary winding of said fan motor comprising of at least equal ampere-turns as said main winding thereof, a common lead from said power supply circuit connecting with one end of said main and auxiliary windings of each of said motors, said common leads to said motors being connected to opposite sides of said power supply circuit, said main windings of each of said motors being connected in parallel with each other across said power supply circuit and said auxiliary windings being connected in series with each other across said power supply circuit, a capacitor connected in series with and between said auxiliary windings of said motors and serving as a starting and running capacitor for both of said motors, an inductive reactance connected in parallel with said main winding of said fan motor and having one end connected between said capacitor and said auxiliary winding of said fan motor, and means for selectively varying said inductive reactance so that the speed of said fan motor is changed with only negligible effect on the electrical characteristics of said compressor motor.

3. In an air conditioning unit having a fan for moving air through said unit and a refrigerating system including a compressor, the combination comprising a compressor motor, a fan motor, a power supply circuit, each of said motors having a main winding and an auxiliary winding, said auxiliary winding of said fan motor consisting of at least equal ampere-turns as said main winding thereof, a common lead from said power supply circuit connecting with one end of said main and auxiliary windings of each of said motors, said common leads to said motors being connected to opposite sides of said power supply circuit, said main windings of each of said motors being connected in parallel with each other and said auxiliary windings of said motors being connected in series with each other, a capacitor connected in series with and between said auxiliary windings of said motors and serving as a starting and running capacitor for both of said motors, thermostat means in said unit for periodically energizing and de-energizing said compressor motor according to the temperature of air moving through said unit while said fan motor operates continuously, an inductive reactance connected in parallel with said main winding of said fan motor and having one end connected between said capacitor and said auxiliary winding of said fan motor, and means accessible from the front of said air conditioning unit for selectively varying said inductive reactance to vary the speed of said fan motor with only a negligible effect on the electrical characteristics of said compressor motor.

References Cited in the file of this patent
UNITED STATES PATENTS

| | | |
|---|---|---|
| 2,128,090 | Hintze | Aug. 23, 1938 |
| 2,245,049 | Pearce | June 10, 1941 |
| 2,320,432 | Henney | June 1, 1943 |
| 2,720,090 | Ford | Oct. 11, 1955 |